US006996743B2

(12) United States Patent
Knapp, III (10) Patent No.: US 6,996,743 B2
(45) Date of Patent: Feb. 7, 2006

(54) METHOD FOR IMPLEMENTING A REDUNDANT DATA STORAGE SYSTEM

(75) Inventor: Henry H. Knapp, III, Centennial, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 519 days.

(21) Appl. No.: 10/206,746

(22) Filed: Jul. 26, 2002

(65) Prior Publication Data

US 2004/0019822 A1 Jan. 29, 2004

(51) Int. Cl.
  *G06F 11/00* (2006.01)
(52) U.S. Cl. ........................................................ 714/6
(58) Field of Classification Search .................. 714/6; 717/174, 175
See application file for complete search history.

(56) References Cited

U.S. PATENT DOCUMENTS

| 5,742,792 | A | * | 4/1998 | Yanai et al. ................. 711/162 |
| 5,928,367 | A | * | 7/1999 | Nelson et al. ................. 714/6 |
| 5,978,565 | A | * | 11/1999 | Ohran et al. ................... 714/13 |
| 6,006,035 | A | * | 12/1999 | Nabahi ......................... 717/175 |
| 6,023,584 | A | * | 2/2000 | Barton et al. ................. 717/177 |
| 6,754,767 | B2 | * | 6/2004 | Gold ........................... 711/114 |
| 2002/0042892 | A1 | * | 4/2002 | Gold ............................. 714/6 |
| 2002/0049925 | A1 | * | 4/2002 | Galipeau et al. ................ 714/6 |
| 2002/0133743 | A1 | * | 9/2002 | Oldfield et al. ................ 714/11 |
| 2004/0073783 | A1 | * | 4/2004 | Ritchie ........................... 713/1 |

* cited by examiner

*Primary Examiner*—Scott Baderman
*Assistant Examiner*—Paul Contino
(74) *Attorney, Agent, or Firm*—Martine Penilla & Gencarella LLP

(57) ABSTRACT

Embodiments of the present invention are directed to a method for installing a redundant data storage system. In one embodiment, the hardware configuration of a computer system is discovered during the installation of a software operating system. An instruction is received describing a first configuration of the computer system wherein a first copy of the software operating system is maintained upon a first data storage device and a second copy of the software operating system is maintained upon a second data storage device of the computer system, the first configuration of the computer system is implemented. The first configuration of the computer system is implemented concurrent with installing the software operating system.

13 Claims, 4 Drawing Sheets

FIGURE 4

METHOD FOR IMPLEMENTING A REDUNDANT DATA STORAGE SYSTEM

FIELD OF THE INVENTION

Embodiments of the present invention relate to data storage systems. More specifically, the present invention pertains to a method for implementing a redundant data storage system.

BACKGROUND OF THE INVENTION

Maintaining a high level of reliability in data storage systems is a major concern for system administrators. As organizations increasingly rely upon distributed computing systems, the requirement to increase the reliability of network components is likewise increasing. Distributed systems are especially vulnerable to failures because of the inter-dependency of their processing nodes. Consequently organizations adopt measures that enhance their fault tolerance not only to recover the failed computing node, but to minimize the system downtime and lost revenues when one of their nodes fails. This is especially true of critical network nodes which require a high level of availability such as file servers, application servers, Web servers, electronic mail (e-mail) servers, etc.

It is especially important to provide redundant data storage devices to prevent the loss of irreplaceable data in the event of device failure. For example, failure of a storage device upon which the operating system is maintained can render the entire system inoperable. Additionally, many times data corruption occurs when the drive fails upon which the operating system is stored.

One method for providing redundant data storage is to use a system called Redundant Array of Independent Disks (RAID). RAID is a way of combining multiple disk drives into a single entity to improve performance and/or reliability and, in some cases, to provide data recovery if a single drive in the array fails. There are a variety of configurations for combining the disks into a single entity which are commonly referred to as RAID levels. For example, RAID level 1, which is also referred to as disk mirroring, stores duplicate sets of identical data on multiple disk drives. RAID can be implemented as either a hardware (e.g., using a special disk controller) or software storage solution. RAID hardware usually comprises a RAID disk controller, such as an adapter card, to which the data cables of the disk drives are connected.

Software RAID is usually implemented as a set of modules and management utilities that implement RAID without requiring extra hardware. For example, the RAID software can be implemented as a kernel level component layer which resides between the computer's file system and the lower-level disk drivers. Software RAID implementations tend to be more flexible than hardware implementations because more configuration options are available to the system administrator.

However, configuration and administration of RAID is a complex task which is typically beyond the skill level of many system administrators. For example, a system administrator executes a series of manual operations such as modifying startup scripts and file system configurations in order to configure the RAID storage. If one of those operations is executed incorrectly, the system may not start up again after being shut down. However, because configuring the system is performed manually, errors are common. Additionally, the RAID configuration cannot presently be performed while installing operating system software because the file management software is not available until after the operating system is installed. This leads to increased administrator workload because the RAID must be configured after the operating system installation.

In the interest of making computer software more user friendly, software is now relied upon to provide system administration solutions which were, at one time, performed manually by highly skilled system administrators. As a result, less technically proficient people are now often utilized to perform system administration tasks. This allows organizations to conserve resources by employing less skilled, and therefore less expensive, personnel to perform system administration duties. Alternatively, larger organizations may save resources by employing one or two highly skilled system administrators and a greater number of less skilled assistants who perform more mundane tasks such as system backups and software installation.

Therefore, in order to perform a relatively complex operation such as configuring a RAID system, a more highly skilled system administrator is needed to either manually configure the system, or to coach a less skilled assistant through the process. This is regarded as a waste of resources on the part of the skilled system administrators who are needed to either manually configure the RAID or to be available to coach less proficient system administrators in the process.

To this end, it would be advantageous to provide a straight forward recovery system to handle cases in which the system disk of the data storage system fails or becomes corrupted. Using such a recovery system, technicians could recover from system disk failures without the need for consulting experienced system administrators.

SUMMARY OF THE INVENTION

Accordingly, a need exists for a method for implementing a redundant data storage system which simplifies the configuring and implementing of a RAID data storage system. While meeting the above stated need, it would be advantageous to provide a method which can automatically implement a RAID-1 data storage system concurrent with the installation of a software operating system. Additionally, while meeting the above stated needs, it would be advantageous to provide a method which automatically stores a mirror copy of the software operating system in the RAID-1 data storage system such that the system can still operate while recovering from a single system disk failure.

Therefore, embodiments of the present invention simplify the configuration and implementation of a RAID data storage system. Furthermore, embodiments of the present invention provide a method which automatically implements a RAID-1 data storage system concurrent with the installation of a software operating system on a computer system. Additionally, embodiments of the present invention automatically store a mirror copy of the software operating system in the RAID-1 data storage system when the operating system is installed.

Embodiments of the present invention are also directed to a method for implementing a redundant data storage system. In one embodiment, the hardware configuration of a computer system is discovered during the installation of a software operating system. An instruction is received describing a first configuration of the computer system. While the software operating system is being installed, the first configuration of the computer system is implemented which automatically creates a redundant data storage system on the computer system.

Embodiments of the present invention implement the configuration instruction and automatically create a RAID-1 data storage system on the computer. For example, a second disk drive in the computer system is designated for maintaining an identical copy of portions of the software operating system. Parameters for the RAID-1 data storage system such as which disk drive to use for the mirror and file system hierarchy can be determined automatically by the present invention, or can be provided by a system administrator. In embodiments of the present invention, a copy of the software operating system is automatically created and maintained on the second disk drive concurrent with the installation of the software operating system.

Embodiments of the present invention allow system administrators with relatively low levels of technical expertise to successfully implement a RAID-1 data storage system while they are installing a software operating system on a computer. If the system administrator chooses to implement the RAID-1 system, the present invention automatically configures the computer system to create the RAID-1 data storage system and maintains multiple copies of the software operating system. In so doing, the computer system is provided with a backup copy of the operating system which can be used to boot the computer in the event that one of the system disk drives fails.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as, "determining," "discovering," "installing," "receiving," "implementing," "creating," "maintaining," "evaluating," "suggesting," "comparing," "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
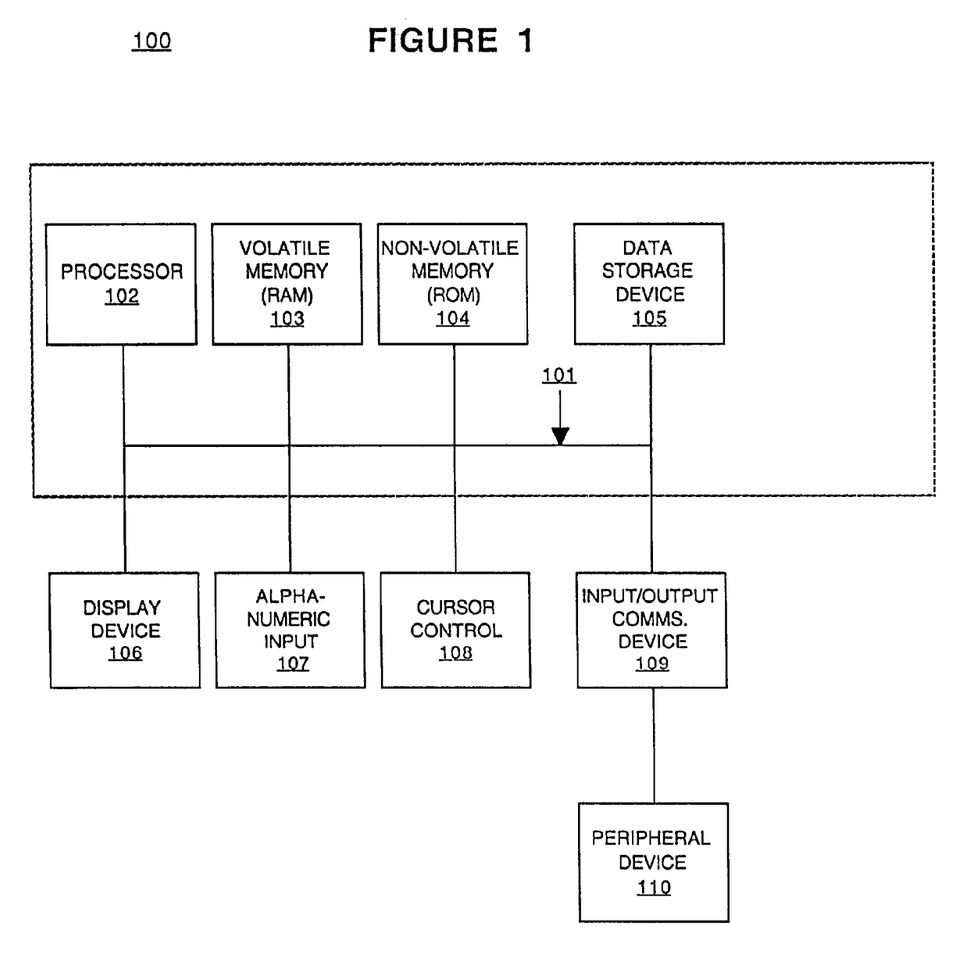
FIG. 1 is a block diagram of an exemplary computer system 100 upon which embodiments of the present invention may be implemented.

With reference to FIG. 1, portions of the present invention are comprised of computer-readable and computer-executable instructions that reside, for example, in computer system 100 which may be used as a part of a general purpose computer network (not shown). It is appreciated that computer system 100 of FIG. 1 is exemplary only and that the present invention can operate within a number of different computer systems including general-purpose computer systems, server systems, embedded computer systems, laptop computer systems, hand-held computer systems, and stand-alone computer systems.

In the present embodiment, computer system 100 includes an address/data bus 101 for conveying digital information between the various components, a central processor unit (CPU) 102 for processing the digital information and instructions, a volatile main memory 103 comprised of volatile random access memory (RAM) for storing the digital information and instructions, and a non-volatile read only memory (ROM) 104 for storing information and instructions of a more permanent nature. In addition, computer system 100 may also include a data storage device 105 (e.g., magnetic drives or the like) for storing vast amounts of data. In embodiments of the present invention, data storage device comprises a plurality of magnetic disk drives. In embodiments of the present invention, data storage devices 105 may comprise network storage devices coupled with computer system 100. It should be noted that the software program for performing a method for installing a redundant data storage system of the present invention can be stored either in volatile memory 103, data storage device 105, or in an external storage device (not shown).

Devices which are optionally coupled to computer system 100 include a display device 106 for displaying information to a computer user, an alphanumeric input device 107 (e.g., a keyboard), and a cursor control device 108 (e.g., mouse, trackball, light pen, etc.) for inputting data, selections, updates, etc. Computer system 100 can also include a mechanism for emitting an audible signal (not shown).

Furthermore, computer system 100 may include an input/output (I/O) signal unit (e.g., interface) 109 for interfacing with a peripheral device 110 (e.g., a computer network, modem, mass storage device, etc.). Accordingly, computer system 100 may be coupled in a network, such as a client/server environment, whereby a number of clients (e.g., personal computers, workstations, portable computers, minicomputers, terminals, etc.) are used to run processes for performing desired tasks (e.g,.) Additionally, it is appreciated that redundant components of computer system 100 may be utilized (e.g., redundant motherboards, power sources, disk controllers, cooling devices, etc.) in order to provide a greater level of fault tolerance.

Figure 2:
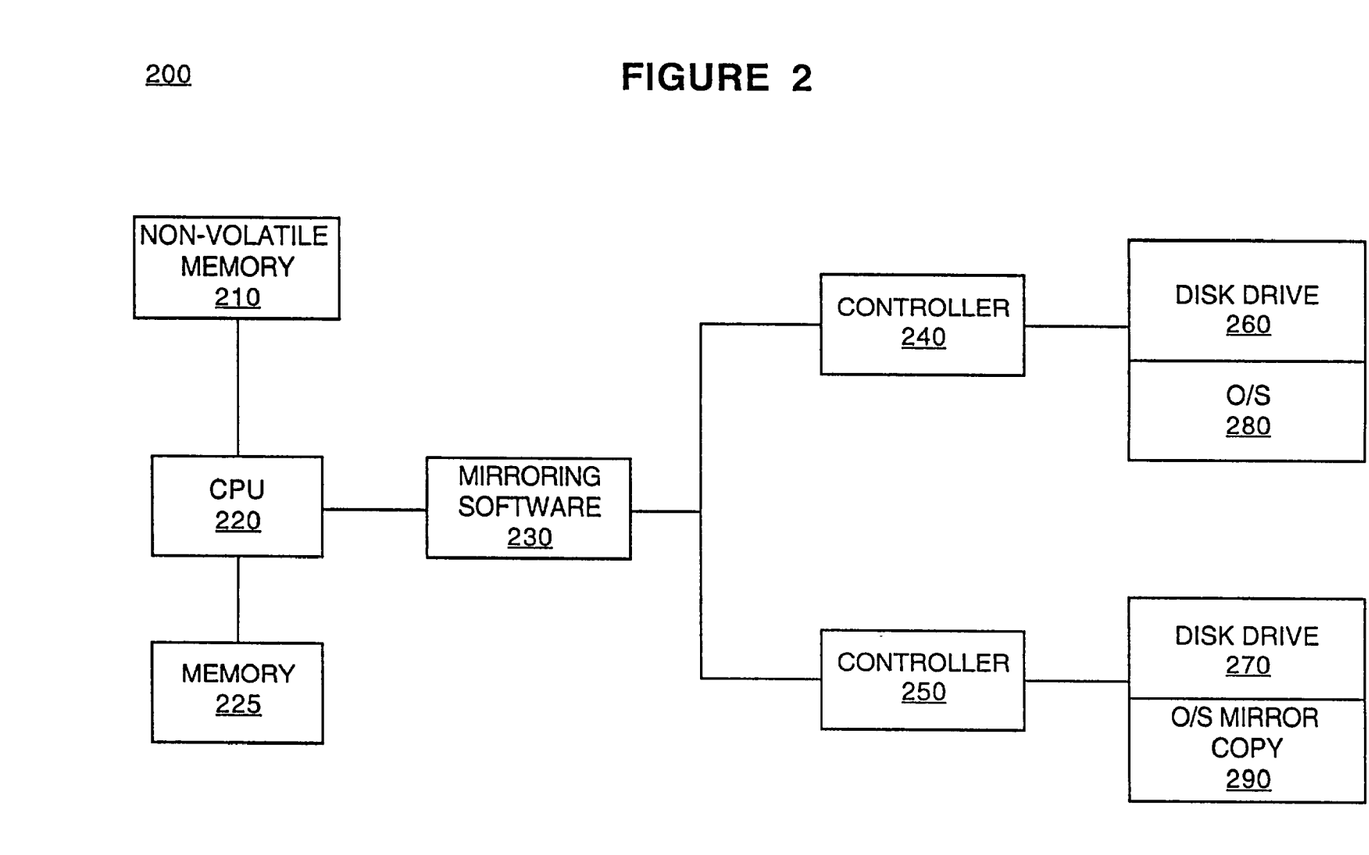
FIG. 2 is a block diagram of components used for implementing a redundant data storage system in accordance with embodiments of the present invention.

FIG. 2 is a block diagram of an exemplary redundant data storage system (e.g., a RAID-1 data storage system) 200 in accordance with embodiments of the present invention. In FIG. 2, a non-volatile memory 210 (e.g., flash memory, EPROM, EEPROM) is used during the boot process to store a limited amount of information needed to initiate loading of the operating system into the memory of the computer. For example, in the embodiment of system 200 non-volatile memory 210 stores instructions and information used to initialize system hardware and network devices (e.g., at boot-up) and for finding the location of the bootable copy of the software operating system. For example, operating system (O/S) 280 may be marked as the bootable copy of the operating system and reside on a disk drive. The boot block points to the portion of disk drive 260 storing the initial elements of the kernel of operating system 280 needed to start running the computer system.

After these initial elements are loaded, the rest of the kernel of operating system 280 is loaded into compute memory and used to operate the redundant data storage system. In one embodiment, mirroring software 230 is also loaded into memory 225 at this time. Mirroring software 230 is described below.

After loading mirroring software 230 from disk drive 260 into memory 225, CPU 220 accesses the controllers (e.g., controller 240 and 250) via the mirroring software. Thus, after loading mirroring software 230, read and write operations performed by CPU 220 are directed to mirroring software 230. From the perspective of CPU 220, mirroring software 230 appears to be a single device. When CPU 220 reads from a virtual address, mirroring software 230 translates the virtual address to a real address on one of the disk drives. Depending on the configuration of mirroring software 230, read operations may be performed from only one disk drive, or may be alternated between both of the disk drives. Write operations are performed on both disk drives in order to maintain an accurate mirror copy. While the embodiment of FIG. 2 shows mirroring software 230 accessing disk drives 260 and 270 via controllers 240 and 250, in other configurations of a RAID-1 data storage system mirroring software 230 may access both disk drives via a single controller (e.g., controller 240).

Mirroring software 230 refers to a software enabled RAID-1 data storage system in which identical, or mirror, copies of software are stored on multiple disk drives. In the embodiment of system 200, disk drive 270 maintains a mirror copy (e.g., O/S mirror copy 290) of O/S 280. Mirroring software 230 is a software I/O driver which handles read and write requests to the disk controllers (e.g., controllers 240 and 250 of FIG. 2) on the part of CPU 220. Prior to loading the mirroring software 230, CPU 220 accesses the controllers directly when performing read/write operations.

In prior art implementations of RAID-1 data storage systems, system administrators do not have access to file management utilities needed for creating the mirror volumes until the operating system has been installed. This in turn leads to increased administrator workload because creating mirror volumes is performed as a separate step after installing the operating system. In embodiments of the present invention, mirroring software 230 and a mirror copy of the operating system (e.g., O/S mirror copy 290) are automatically configured and maintained concurrent with the installation of the operating system (e.g., O/S 280) on system 200. Whether a system administrator selects a default configuration, or manually provides some of the configuration parameters, the present invention automatically installs and configures a RAID-1 data storage system on system 200 and maintains a mirror copy of the software operating system (e.g., O/S copy 2).

Embodiments of the present invention incorporate volume management utilities into the operating system installation software. In one embodiment, the Solaris™ Volume Management utilities are incorporated into the installation software of the Solaris™ operating system. This facilitates creating a RAID-1 data storage system concurrent with the installation of the software operating system. Furthermore, embodiments of the present invention automatically create and maintain a mirror copy of the software operating system (e.g., O/S mirror copy 290 of FIG. 2) on the RAID-1 data storage system concurrent with the installation of the operating system.

Creating a RAID-1 data storage system and a mirror copy of the software operating system is advantageous in that a copy of the software operating system (e.g., O/S mirror copy 290) is still available if one of the system disks fails. For example, if disk drive 260 fails, mirroring software 230 detects the failure and can retrieve a copy (e.g., O/S mirror copy 290) of the operating system from disk drive 270. Additional copies of O/S 280 may be maintained on additional disk drives to provide a higher level of fault tolerance.

Some of the parameters which are automatically configured by embodiments of the present invention include which disk drives to use for mirroring, the size and location of disk partitions (also referred to as slices), configuration of the file system hierarchy, which portions of the file system hierarchy to mirror, etc.

In embodiments of the present invention, a meta-database containing information describing the configuration of the mirrored volumes is maintained on each slice being mirrored. These meta-databases are used to determine the configuration of the system in case one of the disk drives fails. In one embodiment, a odd number of databases is maintained to detect corrupted versions of the database. For example, if 3 meta-databases are maintained, and 1 of them becomes corrupted, the two configurations which are in agreement determine the system configuration. In one embodiment, a system administrator can also specify the locations of additional meta-databases.

Figure 3:
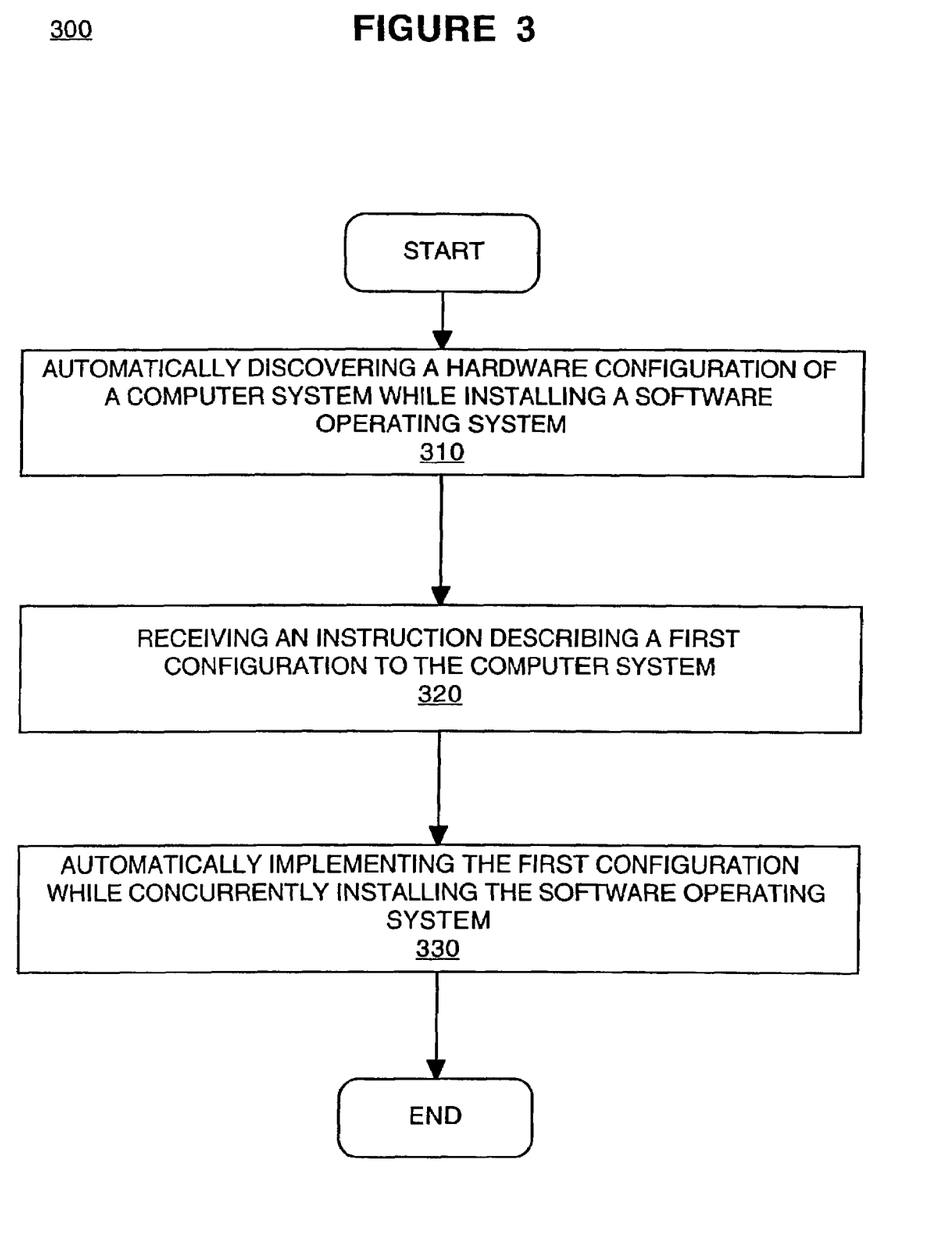
FIG. 3 is a flow chart of an exemplary method for implementing a redundant data storage system in accordance with embodiments of the present invention.

FIG. 3 is a flow chart of a computer controlled method for implementing a redundant data storage system in accordance with embodiments of the present invention. In step 310 of FIG. 3, a hardware configuration of a computer system is automatically discovered while installing a software operating system. In one embodiment, discovering the hardware configuration is performed while running installation software of a version of the Solaris™ operating system. However, while the present embodiment recites the Solaris™ operating system, the present invention may be utilized while installing a variety of software operating systems.

Embodiments of the present invention identify the hardware components currently installed upon a computer system (e.g., computer system 100 of FIG. 1) during the installation of the software operating system. Embodiments of the present invention may also evaluate the reliability and performance of these hardware components and determine a default logical configuration which creates a RAID-1 data storage system. While the present embodiment recites a RAID-1 data storage system, the present invention is well suited for configuring a variety of software enabled redundant data storage systems.

To provide the greatest level of fault tolerance on a computer system, it is preferable to provide redundancy for as many critical components as possible. This can include redundant power supplies, motherboards, disk controllers, disk drives, CPUs, cooling systems, etc. A given computer system may have, for example, 2 available disk drives coupled with disk one controller and 2 other available disk drives coupled with separate disk controllers. In most cases, it is preferable to utilize the 2 disk drives that are coupled with separate controllers in order to provide the greatest level of fault tolerance. Embodiments of the present invention determine a configuration of the available hardware components providing the greatest level of fault tolerance and uses this configuration as the default configuration.

In step 320 of FIG. 3, an instruction is received describing a first configuration of the computer system. In embodiments of the present invention, the computer system may be configured with one copy of the software operating system maintained upon a first data storage device of the computer system and a second copy of the software operating system maintained upon a second data storage device of the computer system. In embodiments of the present invention, a system administrator may be offered the option of creating a RAID-1 data storage system as part of the operating system installation process. If the administrator chooses to create the RAID-1 system, they are then presented with the option of utilizing the default configuration or may choose to provide some or all of the configuration parameters of the RAID-1 system manually.

In one embodiment, the system administrator may instruct the operating system installation software to implement the default configuration. The present invention will implement the default configuration as described above, using default logical configurations. For example, the present invention may install the entire operating system on a single disk partition rather than create separate partitions for various levels of the file system hierarchy. In embodiments of the present invention, redundant hardware components are used when possible to provide the greatest level of fault tolerance. For example, given the option of creating the mirror volumes on disk drives utilizing a single controller or separate controllers, embodiments of the present invention will choose the disk drives utilizing separate controllers by default.

In one embodiment, the administrator may instruct the operating system installation software to run an installation wizard which allows the administrator to configure a limited number of parameters for the system configuration manually. For example, the administrator may specify the disk drives upon which the mirror volumes will be maintained, the configuration of the file system hierarchy, etc. This allows the system administrator to override the default settings if they want a more customized configuration of their computer.

In embodiments of the present invention, the system configuration settings chosen by the system administrator are compared to the default configuration determined by the present invention. If the configuration parameters specified by the system administrator using the installation wizard result in a configuration that provides less fault tolerance than the default configuration, the installation software displays a warning message explaining how the configuration can be improved. The system administrator can proceed with the installation using the vulnerable configuration, or make improvements to it before proceeding.

In another embodiment, the system administrator may choose to manually configure the entire RAID-1 system during the installation of the software operating system. Thus, in one embodiment, the operating system installation hardware receives a plurality of instructions from the system administrator describing the configuration of the computer system. This gives system administrators the greatest level of control over the configuration of the computer system.

This is advantageous over prior art methods for configuring redundant data storage systems in part because previously, this was performed after the operating system was installed on the computer. In the prior art, until the operating system was installed on the computer system, there were no volume management utilities available to create a redundant data storage system such as a RAID-1 storage system. However, the present invention incorporates volume management utilities into the operating system installation software. In one embodiment, the Solaris™ Volume Management utilities are incorporated into the installation software of the Solaris™ operating system. This facilitates creating a RAID-1 data storage system concurrent with the installation of the software operating system. Furthermore, embodiments of the present invention automatically create and maintain a mirror copy of the software operating system (e.g., O/S mirror copy 290 of FIG. 2) on the RAID-1 data storage system concurrent with the installation of the operating system. Thus, upon installation of the software operating system, a second copy of the operating system will be available in case one of the system disks fails. Additionally, embodiments of the present invention can determine a default configuration for the computer system and thus allow less technically proficient system administrators to create a redundant data storage system when installing the software operating system.

Again, in embodiments of the present invention, the system configuration provided by the system administrator is compared to the default configuration determined by the present invention. If the configuration parameters specified by the system administrator result in a configuration that is less fault tolerant than the default configuration, the installation software displays a warning message explaining how the configuration could be improved. The system administrator can proceed with the installation using the vulnerable configuration, or make improvements to it before proceeding.

In another embodiment, the instruction describing the configuration of the computer system may be received from a data file. Some operating systems allow the option of an automated installation process. For example, the computer system being configured can be coupled with a computer network and receive the operating system via network connections. Typically, the installation process is initiated automatically and configuration parameters for the computer system are read from the data file stored remotely on the network. This allows installation of the software operating system without the necessity of having a system administrator physically present.

In an embodiment of the present invention, used during an automatic installation of the Solaris™ operating system, the desired configuration is maintained in a text file called a profile. The profile is comprised of text lines beginning with key words. Space separated strings follow the keyword on each line. The keywords indicate the parameters to be set and the space separated strings that follow the keywords indicate the values to which the parameters will be set.

Mirroring of the file systems is automated by adding an optional "mirror" qualifier to the "filesys" profile keyword. In one embodiment, the syntax is: filesys mirror <slice> <slice> <size> <file_system> [mount-options].

The first <slice> entry in the string refers to the slice which will be mirrored. The second <slice> entry in the string refers to the mirror volume being created. An example of the syntax for the variable <slice> is c<C>t<T>d<D>s<S>, where <C> is the number of the controller controlling the disk on which the slice is located. <T> is the target number of the disk on which the slice is located, <D> is the disk number of the disk on which the slice is located, and <S> is the slice number (e.g., c0t0d0s0).

The variable <size> is the size of the mirror volume in megabytes (e.g., 100000=100 Gb) The variable <file_system> is the mount point name which specifies where in the file system hierarchy the file are accessed from (e.g., /, /usr, /var, etc.). The variable [mount_options] are optional mount options to be added to the /etc/vfstab entry for the specified mount point name.

The installation software will automatically add replicas of the configuration databases, also referred to as metadbs, to the slices being mirrored. Additionally, the system administrators may add more metadbs to the system by specifying additional locations. In one embodiment, the syntax of the metadb keyword is:
metadb <slice> [size].

The variable <slice> in the string refers to the partition where the additional metadb will be located. The system administrator can specify more than one additional slice. An example of the syntax for the variable <slice> is c<C>t<T>d<D>s<S>, where <C> is the number of the controller controlling the disk on which the slice is located. <T> is the target number of the disk on which the slice is located, <D> is the disk number of the disk on which the slice is located, and <S> is the slice number (e.g., c0t0d0s0).

The variable [size] is an optional parameter specifying the size of the metadb in blocks. If the system administrator does not specify the size of the metadb, the present invention will create metadbs of a default size. The present invention will allocate space for the metadb on the slice specified by the <slice> variable and install it there. If a mirrored file system is to be located on the slice, the present invention will not install another metadb on the slice, as it automatically installs a metadb on each mirrored slice.

In step 330 of FIG. 3, the first configuration is automatically implemented while concurrently installing the software operating system. In embodiments of the present invention, the first configuration, as described in the instruction received in step 320, is automatically implemented while the software operating system is being installed. Embodiments of the present invention incorporate volume management utilities with the operating system installation software to facilitate creating a redundant file storage system concurrent with the installation of the operating system. In one embodiment, the Solaris™ Volume Management utilities are incorporated into the installation software of the Solaris™ operating system. This is advantageous over the prior art in part because unless there was a working operating system installed on the computer, a RAID-1 data storage system could not be installed. Additionally, in accordance with embodiments of the present invention, a second copy of the software operating system (e.g., O/S mirror copy 290 of FIG. 2) is automatically created and maintained in a second data storage device (e.g., disk drive 270 of FIG. 2) concurrent with installing the operating system (e.g., O/S 280 of FIG. 2).

Figure 4:
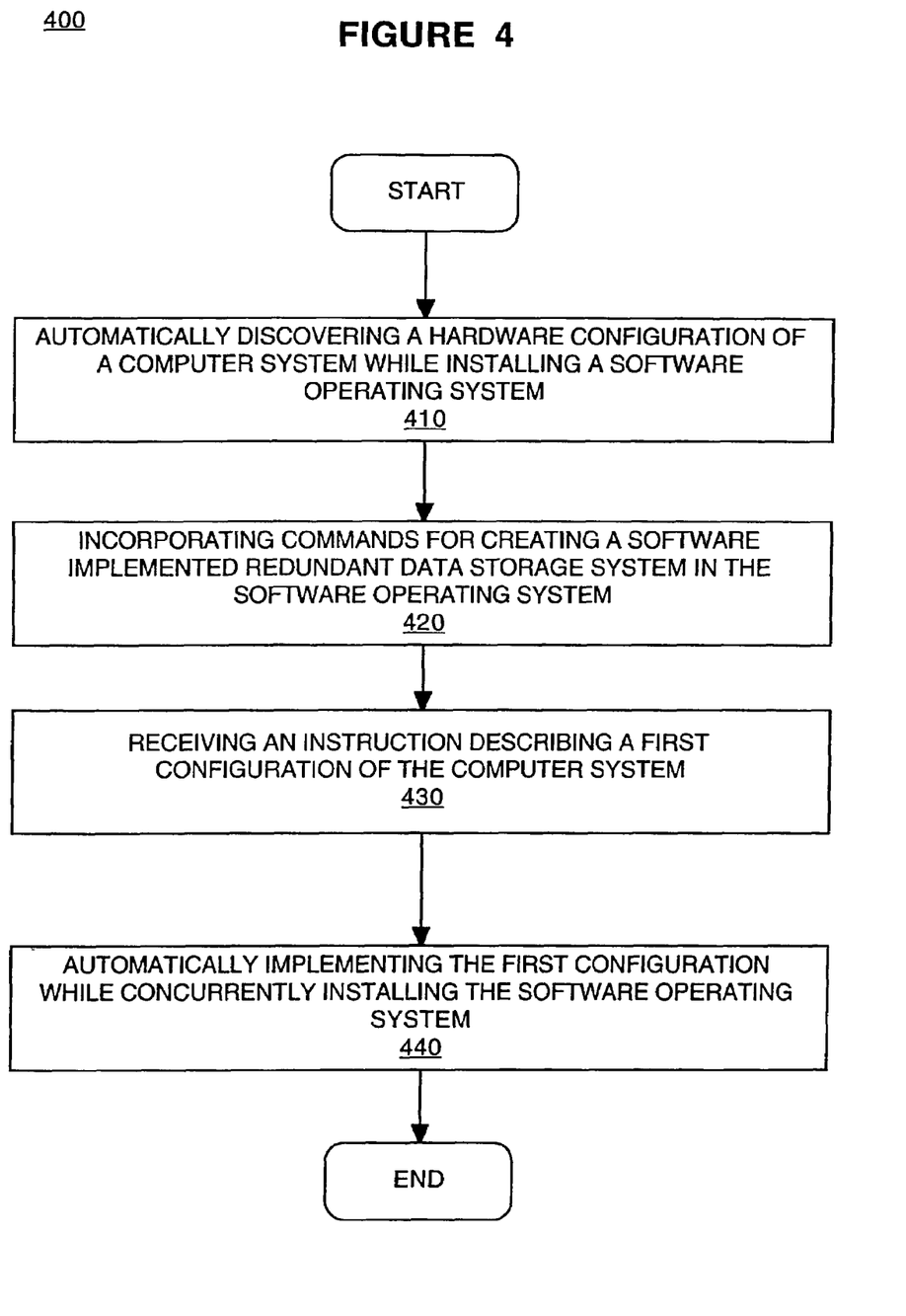
FIG. 4 is a flow chart of an exemplary method for implementing a redundant data storage system in accordance with embodiments of the present invention.

FIG. 4 is a flow chart of a computer controlled method 400 for implementing a redundant data storage system in accordance with embodiments of the present invention. In step 410 of FIG. 4, the hardware configuration of a computer system is automatically discovered while installing a software operating system. As described above, in embodiments of the present invention, when a software operating system is installed on a computer system, the configuration of the hardware of the computers system is automatically discovered.

In step 420 of FIG. 4, commands for creating a redundant data storage system are incorporated in the software operating system. In embodiments of the present invention, volume management utilities are incorporated into the operating system installation software. In one embodiment, the Solaris™ Volume Management utilities are incorporated into the installation software of the Solaris™ operating system. This facilitates creating, for example, a RAID-1 data storage system on a computer system concurrent with the installation of the software operating system. This is advantageous over prior art methods for configuring redundant data storage systems because previously, this was performed after the operating system was installed on the computer. In the prior art, until the operating system was installed on the computer, the volume management utilities needed to create a redundant data storage system could not be installed.

In step 430 of FIG. 4, an instruction is received describing a first configuration of the computer system. In embodiments of the present invention, this instruction may comprise accepting a default configuration of a redundant data storage system. In another embodiment of the present invention, this instruction comprises accepting an instruction from a system administrator describing a configuration of a redundant data storage system.

In step 440 of FIG. 4, the first configuration is automatically implemented concurrent with the installation of the software operating system. In embodiments of the present invention a first copy of the software operating system is maintained upon a first data storage device of the computer system and a second copy of the software operating system is maintained upon a second data storage device of the computer system.

Embodiments of the present invention implement the configuration of step 430 and automatically create a RAID-1 data storage system on the computer concurrent with the installation of the software operating system. This is advantageous over prior art methods for configuring redundant data storage systems because previously, this was performed after the operating system was installed on the computer. In the prior art, until the operating system was installed on the computer system, there were no volume management utilities available to create a redundant data storage system such as a RAID-1 storage system. However, the present invention incorporates volume management utilities into the operating system installation software.

The preferred embodiment of the present invention, a method for implementing a redundant data storage system wherein a first copy of a software operating system is maintained upon a first data storage and a second copy of the software operating system is maintained upon a second data storage device of a computer system, is thus described. While the present invention has been described in particular embodiments, it should be appreciated that the present invention should not be construed as limited by such embodiments, but rather construed according to the following claims.

What is claimed is:

1. A method for implementing a redundant data storage system comprising:

automatically determining a hardware configuration of a computer system while installing a software operating system on a first data storage device of said computer system, the computer system comprising at least the first data storage device and a second data storage device, each of the first and second data storage devices comprising a disk storage device for general data storage for the computer system;

receiving an instruction requesting implementation of a first configuration of said computer system, the first configuration comprising a redundant array of independent disks (RAID) configuration, the RAID configuration mirroring the first data storage device and the second data storage device such that a first copy of said software operating system is maintained upon the first data storage device of said computer system and a second copy of said software operating system is maintained upon the second data storage device of said computer system; and automatically implementing said RAID configuration while installing said software operating system on the first and second data storage devices.

2. The method as recited in claim 1, wherein said RAID configuration is implemented in software using an in/out (i/o) driver.

3. The method as recited in claim 2, wherein said RAID configuration comprises a RAID-1 data storage system.

4. The method as recited in claim 2, further comprising maintaining information about said RAID configuration in a non-volatile memory device.

5. The method as recited in claim 1, wherein said determining further comprises evaluating said hardware configuration and determining a default configuration of said computer system based upon said evaluating.

6. The method as recited in claim 5, wherein said first configuration is a user selected configuration and further comprising generating and displaying a warning message if the first configuration provides less fault tolerance than the default configuration.

7. A computer-usable medium having computer-readable program code embodied therein for causing a computer system to perform a method for installing a redundant data storage system comprising:

automatically determining a hardware configuration of a computer system while installing a software operating system on a first data storage device of said computer system, the computer system comprising at least the first data storage device and a second data storage device, each of the first and second data storage devices comprising a disk storage device for general data storage for the computer system;

receiving an instruction requesting implementation of a first configuration of said computer system, the first configuration comprising a redundant array of independent disks (RAID) configuration, the RAID configuration mirroring the first data storage device and the second data storage device such that a first copy of said software operating system is maintained upon the first data storage device of said computer system and a second copy of said software operating system is maintained upon the second data storage device of said computer system; and automatically implementing said first configuration while installing said software operating system on the first and second data storage devices.

8. The computer usable medium of claim 7, wherein said RAID configuration is implemented in software using an in/out (i/o) driver.

9. The computer usable medium of claim 8, wherein said RAID configuration comprises a RAID-1 data storage system.

10. The computer usable medium of claim 8, further comprising maintaining information about said RAID configuration in a non-volatile memory device.

11. The computer usable medium of claim 7, wherein said determining further comprises evaluating said hardware configuration and determining a default configuration of said computer system based upon said evaluating.

12. The computer usable medium of claim 11, wherein said first configuration is a user selected configuration and further comprising generating and displaying a warning message if the first configuration provides less fault tolerance than the default configuration.

13. A computer system comprising:

a processor in communication with a data bus, volatile memory in communication with the data bus; and a plurality of data storage devices in communication with the data bus, the plurality of data storage devices comprising at least a first slice and a second slice, the first and second slice mirroring each other in a redundant array of independent disks (RAID) configuration, each of the first and second slices containing a copy of an operating system, the operating system containing code for booting the computer system and controlling operation the computer system, the operating system including a software i/o driver that implements of the RAID configuration and handles read and write requests to disk controllers controlling the data storage devices, wherein, if either of the slices fail, the computer system can boot from and load the copy of the operating system stored in an other of the first and second slices, wherein the RAID configuration is created during installation of the operating system on the first and second slices.

* * * * *